(12) United States Patent
Plewnia (10) Patent No.: US 11,691,606 B2
(45) Date of Patent: Jul. 4, 2023

(54) HYDRAULIC MOTOR VEHICLE BRAKE SYSTEM AND METHOD FOR OPERATING SAME

(71) Applicant: ZF Active Safety GmbH, Koblenz (DE)

(72) Inventor: Heinrich Plewnia, Niederhofen (DE)

(73) Assignee: ZF Active Safety GmbH, Koblenz (DE)

(*) Notice: Subject to any disclaimer, the term of this patent is extended or adjusted under 35 U.S.C. 154(b) by 382 days.

(21) Appl. No.: 16/715,543

(22) Filed: Dec. 16, 2019

(65) Prior Publication Data
US 2020/0207320 A1    Jul. 2, 2020

(30) Foreign Application Priority Data

Dec. 28, 2018   (DE) .......................... 102018010167.4

(51) Int. Cl.
| | |
|---|---|
| *B60T 13/66* | (2006.01) |
| *B60T 13/58* | (2006.01) |
| *B60T 13/14* | (2006.01) |
| *B60T 13/68* | (2006.01) |

(52) U.S. Cl.
CPC ............ *B60T 13/58* (2013.01); *B60T 13/148* (2013.01); *B60T 13/686* (2013.01); *B60T 2270/402* (2013.01); *B60T 2270/413* (2013.01)

(58) Field of Classification Search
CPC .... B60T 13/745; B60T 8/4275; B60T 8/4872; B60T 2270/413; B60T 2270/82; B60T 2270/402; B60T 13/58; B60T 13/148; B60T 13/686

USPC .................................................. 303/DIG. 11
See application file for complete search history.

(56) References Cited

U.S. PATENT DOCUMENTS

| | | | | |
|---|---|---|---|---|
| 5,374,112 A | * | 12/1994 | Takata ................... | B60T 8/4872 |
| | | | | 303/116.1 |
| 5,927,828 A | * | 7/1999 | Beck ...................... | B60T 8/3675 |
| | | | | 303/DIG. 11 |
| 8,215,724 B2 | * | 7/2012 | Aoba ...................... | B60T 8/368 |
| | | | | 303/DIG. 11 |
| 8,783,793 B2 | * | 7/2014 | Terashima ............ | B60T 13/686 |
| | | | | 303/DIG. 11 |
| 9,884,613 B2 | * | 2/2018 | Tsuruoka ............... | B60T 8/4872 |

(Continued)

FOREIGN PATENT DOCUMENTS

| | | |
|---|---|---|
| DE | 102016201047 A1 | 8/2016 |
| DE | 102016213994 A1 | 2/2018 |

*Primary Examiner* — Bradley T King
(74) *Attorney, Agent, or Firm* — Robert James Harwood (57) ABSTRACT

A brake system includes a first functional unit having at least one first hydraulic pressure generator, which is designed to build up a hydraulic pressure at a wheel brake, and a first hydraulic fluid reservoir, from which the first hydraulic pressure generator can draw in hydraulic fluid. The brake system furthermore comprises a second functional unit having at least one second, electric hydraulic pressure generator, which is controllable in order to build up a hydraulic pressure at the wheel brake, a check valve and at least one second hydraulic fluid reservoir, having an outlet, via which the second, electric hydraulic pressure generator can draw in hydraulic fluid, and an inlet, relative to which the check valve is arranged upstream in such a way that it has a blocking effect toward the inlet in respect of a flow direction.

15 Claims, 4 Drawing Sheets

(56) References Cited

U.S. PATENT DOCUMENTS

| | | | | |
|---|---|---|---|---|
| 2004/0084958 A1* | 5/2004 | Ariki | ............ | B60T 17/222 |
| | | | | 303/DIG. 11 |
| 2007/0228820 A1* | 10/2007 | Nakamura | ............ | B60T 8/4081 |
| | | | | 303/DIG. 11 |
| 2009/0039702 A1* | 2/2009 | Nishino | ............ | B60T 7/042 |
| | | | | 303/114.1 |
| 2011/0241417 A1* | 10/2011 | Miyazaki | ............ | B60T 13/166 |
| | | | | 303/2 |
| 2014/0028084 A1* | 1/2014 | Biller | ............ | B60T 13/686 |
| | | | | 303/9.62 |
| 2014/0116244 A1* | 5/2014 | Murayama | ............ | B60T 8/4872 |
| | | | | 91/418 |
| 2014/0361204 A1* | 12/2014 | Kratzer | ............ | B60T 8/368 |
| | | | | 251/63.6 |
| 2017/0158179 A1* | 6/2017 | Choi | ............ | B60T 7/042 |
| 2019/0106091 A1* | 4/2019 | Kato | ............ | B60T 17/221 |

* cited by examiner

HYDRAULIC MOTOR VEHICLE BRAKE SYSTEM AND METHOD FOR OPERATING SAME

CROSS-REFERENCE TO RELATED APPLICATION

This application claims priority to German Patent Application No. 10 2018 010 167.4, filed Dec. 28, 2018, the disclosure of which is incorporated herein by reference in its entirety.

TECHNICAL FIELD

In general terms, the present disclosure relates to the field of motor vehicle brake systems. More specifically, a hydraulic motor vehicle brake system and a method for operating same are described.

BACKGROUND

Conventional hydraulic motor vehicle brake systems operating on the brake-by-wire (BBW) principle comprise an electric hydraulic pressure generator, which generates the brake pressure at the wheel brakes of the motor vehicle in the normal braking mode. For this purpose, a vehicle deceleration demanded by the driver at a brake pedal is detected by sensor means and converted into a control signal for the electric hydraulic pressure generator.

To ensure that a brake pressure can still be built up at the wheel brakes, even if the electric hydraulic pressure generator fans, hydraulic brake systems based on the BBW principle generally additionally comprise a master cylinder, by means of which hydraulic fluid can likewise be delivered to the wheel brakes. In the normal braking mode, the brake pedal is decoupled from the master cylinder, or the master cylinder is decoupled from the wheel brakes. In this case, a brake pressure at the wheel brakes is built up exclusively by means of the electric hydraulic pressure generator. In the emergency braking mode, in contrast, that is to say, for example, if the electric hydraulic pressure generator fails, the decoupling is canceled. Thus, a brake pressure can be generated at the wheel brakes by the driver himself by means of the brake pedal acting on the master cylinder.

Owing to the canceled decoupling of the brake pedal and the master cylinder or the master cylinder and the wheel brakes, the emergency braking mode is also referred to as a push-through (PT) mode. The possibility made available to the driver of being able to build up a brake pressure at the wheel brakes via the master cylinder in the PT mode creates a redundancy, which is indispensable in many cases for safety considerations.

Motor vehicle brake systems for autonomous or partially autonomous driving must likewise be of redundant design. In that case, however, it can no longer be assumed that the driver will even be in the vehicle (e.g. in a remote-controlled parking, RCP, mode) or that the driver will be able to actuate a brake pedal without delay for the PT mode (e.g. when looking away from the traffic situation). In other words, the driver is not present as a redundant element for brake pressure generation.

For this reason, there is a demand that a brake system for autonomous or partially autonomous driving should comprise not only a functional unit which provides an electrically controllable master braking function but also a further functional unit, which is capable of implementing an electrically controllable auxiliary braking function in a redundant way. The brake pedal and the master cylinder arranged downstream of the latter can then be retained or eliminated, depending on safety requirements.

SUMMARY

It is the underlying object of the present disclosure to specify a hydraulic motor vehicle brake system which redundantly comprises two hydraulic pressure generators and meets high safety requirements.

According to a first aspect, a hydraulic motor vehicle brake system is specified. The brake system comprises a first functional unit having at least one first hydraulic pressure generator, which is designed to build up a hydraulic pressure at a wheel brake, and a first hydraulic fluid reservoir, from which the first hydraulic pressure generator can draw in hydraulic fluid. The brake system furthermore comprises a second functional unit having at least one second, electric hydraulic pressure generator, which is controllable in order to build up a hydraulic pressure at the wheel brake, a check valve and at least one second hydraulic fluid reservoir, having an outlet, via which the second, electric hydraulic pressure generator can draw in hydraulic fluid, and an inlet, relative to which the check valve is arranged upstream in such a way that it has a blocking effect toward the inlet in respect of a flow direction. The second functional unit furthermore comprises a device for opening the check valve when the second hydraulic fluid reservoir reaches a predetermined filling level during an intake process of the second, electric hydraulic pressure generator or the second, electric hydraulic pressure generator begins an intake process at a predetermined filling level, with the result that the second, electric hydraulic pressure generator can draw in hydraulic fluid through the second hydraulic fluid reservoir and via the opened check valve.

The first hydraulic pressure generator can be designed as an electric hydraulic pressure generator (e.g. as an electric hydraulic pressure generator that can be controlled in accordance with the BBW principle) or as a conventional master cylinder actuable exclusively by means of a brake pedal, without electric-motor assistance. Both aspects can be combined, such that the first hydraulic pressure generator is designed as a master cylinder which is actuable by means of a brake pedal and has electric brake boosting.

In some implementations, the predetermined filling level of the second hydraulic fluid reservoir can correspond to a completely filled and, in particular, a substantially emptied second hydraulic fluid reservoir. By virtue of the design, it may not be possible to empty the second hydraulic fluid reservoir completely in some variants. The predetermined filling level can be less than 10% of the maximum filling level of the second hydraulic fluid reservoir, e.g. less than 5% or 1% of the maximum filling level. The predetermined filling level can be a minimum filling level.

The second hydraulic fluid reservoir can comprise a movably accommodated piston. The predetermined filling level can be defined by a stop. The piston can come into contact with the stop when the second hydraulic fluid reservoir is emptied. As an alternative, the stop can also be formed on the piston (e.g. in the form of a projection). In the case of contact by the stop or contact with the stop, the second hydraulic fluid reservoir is free from residual pressure, even if the piston is subject to spring force.

The device can comprise the piston, which is accommodated movably in the second hydraulic fluid reservoir, and an actuating element, which is movable together with the piston. The actuating element can interact with a valve member of the check valve. For example, the actuating element can raise the valve member from a valve seat of the check valve.

The actuating element can comprise a tappet, which is coupled to the piston and can extend through the inlet in order to interact with the valve member. According to one variant, the tappet is coupled rigidly to the piston. According to another variant, the tappet is coupled movably to the piston in order to move away from the piston during the intake process. Thus, the tappet can be arranged on a diaphragm, which extends over at least some region of a surface of the piston and can be raised from the surface. In order to allow raising in this way, the diaphragm can communicate with atmospheric pressure on its side facing away from the tappet. For example, the piston can comprise a passage which opens into the piston surface at one end and communicates with atmospheric pressure at another end.

The second hydraulic fluid reservoir can be designed as a low-pressure accumulator subject to spring force. The spring force selected can be very low. The spring force can lead to a hydraulic pressure of less than 1 bar, e.g. less than 0.5 bar or 0.1 bar. In another variant, the second hydraulic fluid reservoir, in particular in the or a piston accommodated movably therein, can be subject exclusively to atmospheric pressure.

The second hydraulic fluid reservoir may not be completely filled in a normal operating state of the brake system. The normal operating state may be an operating state in which no wheel brake pressure control is active. Thus, in this operating state, the filling level of the second hydraulic fluid reservoir may correspond to the predetermined filling level, which may, in particular, be a minimum filling level.

The second functional unit can comprise a first valve assembly, which is assigned to the wheel brake. The first valve assembly can comprise one or more valves and, in particular, can consist of two valves. The first valve assembly can be controllable in order to carry out at least one of the following steps: (1) reducing a wheel brake pressure via an opened first valve of the first valve assembly, said valve being provided between the wheel brake and the second hydraulic fluid reservoir, in order to discharge hydraulic fluid from the wheel brake into the second hydraulic fluid reservoir; (2) trapping a wheel brake pressure with the first valve assembly closed; and (3) building up or increasing a wheel brake pressure via an opened second valve of the first valve assembly, said valve being provided between the second, electric hydraulic pressure generator and the wheel brake, and generating a hydraulic pressure by means of the second, electric hydraulic pressure generator.

The brake system can be designed in such a way that the second, electric hydraulic pressure generator can draw in hydraulic fluid from the second hydraulic fluid reservoir to build up or increase the wheel brake pressure until the predetermined filling level has been achieved and the check valve has been opened. Following this, the intake process can take place from a hydraulic fluid reservoir arranged downstream of the second hydraulic fluid reservoir. The downstream hydraulic fluid reservoir can be part of the first functional unit or of the second functional unit.

In the event of a malfunction of the second functional unit, e.g. a failure of the second, electric hydraulic pressure generator, functions of the second functional unit can be taken over by the first functional unit, in particular by the first hydraulic pressure generator if the latter is electrically controllable. These functions can comprise wheel brake pressure control functions, e.g. for slip control (such as preventing locking up a wheel).

The wheel brake can be assigned to a rear axle of the motor vehicle. The second valve of the first valve assembly can be closed in an electrically unactivated state. A further wheel brake can be assigned to a front axle of the motor vehicle. A further first valve assembly having a further second valve can be assigned to the further wheel brake, wherein the further second valve is opened in an electrically unactivated state. Such a configuration is advantageous, for example, if slip control is performed by means of the first functional unit in the event of a malfunction of the second functional unit. If the second valve assigned to the wheel brake of the rear axle is then closed, and the second valve assigned to the wheel brake of the front axle is opened, control can be focused on the wheel brake of the front axle, at which a higher deceleration can be achieved. At the same time, overbraking at the rear axle and a resulting instability of the vehicle is prevented. It should be noted that this solution can be implemented independently of the provision of the abovementioned check valve and of the device for opening the latter.

The second functional unit can comprise a second valve assembly, which is arranged in a fluid path which extends parallel to the second hydraulic reservoir. This fluid path can be a bypass path in relation to the second hydraulic reservoir, said bypass path being selectively activatable by means of the second valve assembly.

The second functional unit can comprise a third hydraulic fluid reservoir, wherein the check valve is arranged in a hydraulic path between the inlet of the second hydraulic fluid reservoir and an outlet of the third hydraulic fluid reservoir. This enables the second, electric hydraulic pressure generator to draw in hydraulic fluid from the third hydraulic fluid reservoir through the second hydraulic fluid reservoir and via the opened check valve. The third hydraulic fluid reservoir can be a low-pressure accumulator or an accumulator subject exclusively to atmospheric pressure.

The third hydraulic fluid reservoir can be substantially filled in a normal operating state of the brake system in order to be able to make available hydraulic fluid to the second, electric hydraulic pressure generator. The normal operating state may be an operating state in which no wheel brake pressure control is active. The hydraulic fluid drawn in from the third hydraulic pressure accumulator by the second, electric hydraulic pressure generator can be used for wheel brake pressure control operations, e.g. for control interventions of an antilock system or of an electronic stability control system. The third hydraulic fluid reservoir can have an inlet, wherein a hydraulic path starting from the first functional unit opens into the inlet of the third hydraulic fluid reservoir. Via this path, the third hydraulic fluid reservoir can be filled (replenished) with hydraulic fluid if required.

The second functional unit can comprise a third valve assembly, which is arranged in a fluid path which extends parallel to the third hydraulic reservoir. This fluid path can be a bypass path in relation to the third hydraulic reservoir, said bypass path being selectively activatable by means of the third valve assembly. The second functional unit can be arranged in a hydraulic fluid path between the first functional unit and the wheel brake. In other words, hydraulic fluid which is to be delivered from the first functional unit to the wheel brakes can be delivered through the second functional unit. In this context, each of the two functional units can have a separate housing block.

The first functional unit can be assigned a first control unit. In the same way, the second functional unit can be assigned a second control unit. The respective control unit can be designed to control the components of the respective functional unit. In some cases, at least one of the two control units can perform control functions of the other control unit in a redundant way.

The first hydraulic pressure generator or a further hydraulic pressure generator (e.g. a master cylinder), which can be coupled to the wheel brake and is included by the first functional unit, can be actuable by means of a brake pedal. In this case, the first functional unit can comprise a fourth valve assembly, which is designed to couple the wheel brake either to the first hydraulic pressure generator, which is, in particular, electric, or to the further hydraulic pressure generator. Thus, in a normal BBW mode, the first, in particular electric, hydraulic pressure generator can be coupled to the wheel brake whereas, in the case of a PT mode, the further hydraulic pressure generator is coupled to the wheel brake.

A second aspect relates to a method for operating a hydraulic motor vehicle brake system, wherein the brake system comprises a first functional unit having at least one first hydraulic pressure generator, which is designed to build up a hydraulic pressure at a wheel brake, and a first hydraulic fluid reservoir, from which the first hydraulic pressure generator can draw in hydraulic fluid. The brake system furthermore comprises a second functional unit having at least one second, electric hydraulic pressure generator, which is controllable in order to build up a hydraulic pressure at the wheel brake, a check valve and at least one second hydraulic fluid reservoir, having an outlet, via which the second, electric hydraulic pressure generator can draw in hydraulic fluid, and an inlet, relative to which the check valve is arranged upstream in such a way that it has a blocking effect toward the inlet in respect of a flow direction. The method comprises the steps of opening the check valve when the second hydraulic fluid reservoir reaches a predetermined filling level during an intake process of the second, electric hydraulic pressure generator or the second, electric hydraulic pressure generator begins an intake process at a predetermined filling level, and drawing in hydraulic fluid through the second hydraulic fluid reservoir and via the opened check valve.

In general terms, the method in accordance with the second aspect can comprise one or more further steps, as described above and below. The method in accordance with the second aspect can be carried out by one of the brake systems in accordance with the first aspect and can comprise the further steps described in this context.

According to a third aspect, a hydraulic motor vehicle brake system having front wheel brakes and rear wheel brakes is specified, which comprises a first functional unit having at least one first hydraulic pressure generator, which is designed to build up a respective hydraulic pressure at the front wheel brakes and the rear wheel brakes, and a first valve assembly, which is arranged between the first hydraulic pressure generator and the front wheel brakes, and a second valve assembly, which is arranged between the first hydraulic pressure generator and the rear wheel brakes. The brake system furthermore comprises a second functional unit having at least one second, electric hydraulic pressure generator, which is controllable in order to build up a respective hydraulic pressure at the front wheel brakes and the rear wheel brakes, and a third valve assembly for each wheel brake, which can be controlled for wheel brake pressure control operations at the corresponding wheel brake. The brake system furthermore comprises a control system, which is designed to control at least one of the first valve assembly and the second valve assembly in the case of hydraulic pressure generation by means of the first hydraulic pressure generator in the event of a malfunction of the second functional unit, such that a lower hydraulic pressure is established at the rear wheel brakes than at the front wheel brakes.

The first hydraulic pressure generator can be designed as an electric hydraulic pressure generator (e.g. as an electric hydraulic pressure generator that can be controlled in accordance with the BBW principle) or as a conventional master cylinder actuable exclusively by means of a brake pedal, without electric-motor assistance. Both aspects can be combined, such that the first hydraulic pressure generator is designed as a master cylinder which is actuable by means of a brake pedal and has electric brake boosting.

The control system can be designed to detect a malfunction of the second functional unit and, in this case, to perform control in accordance with a control strategy which prevents locking up of the front wheels. Thus, the control system can be designed to limit the hydraulic pressure built up by the first hydraulic pressure generator during this process by means of the second valve assembly in such a way that the rear wheels do not lock up.

The first valve assembly can comprise at least one first valve capable of analog adjustment. In addition or as an alternative, the second valve assembly can comprise at least one second valve capable of analog adjustment. The valve capable of analog adjustment can be controlled in order to set an opening cross section which is other than completely open or completely closed. The valve capable of analog adjustment can be controllable in a passive way (e.g. by a prevailing hydraulic pressure) or in an active way (e.g. electrically). The control system can be designed to control the at least one second valve capable of analog adjustment in accordance with a control strategy which prevents lockup of the rear wheels.

The first functional unit can comprise a first pressure sensor in a fluid path between the second valve assembly and the rear wheel brakes. In this case, the control system can be designed to take account of an output signal of the first pressure sensor in controlling the at least one second valve capable of analog adjustment. The second functional unit can comprise a second pressure sensor in a fluid path to the front wheel brakes. An output signal of the second pressure sensor can be used for wheel brake pressure control operations.

The first functional unit can comprise a third hydraulic pressure generator, which is actuable by means of a brake pedal and by means of which a respective hydraulic pressure can be built up at the front wheel brakes and the rear wheel brakes. The first functional unit can comprise a third pressure sensor in a fluid path between the third hydraulic pressure generator and the front wheel brakes. An output signal of the third pressure sensor can be used for wheel brake pressure control operations. The first functional unit can comprise a fourth valve assembly, which is designed to selectively couple or decouple the third hydraulic pressure generator to or from the front wheel brakes and the rear wheel brakes. The fourth valve assembly can comprise the first valve assembly and the second valve assembly.

The first valve assembly can comprise at least one digitally switchable first valve. In addition or as an alternative, the second valve assembly can comprise at least one digitally switchable second valve. The digitally switchable valve can be controlled in order to set an opening cross section which can assume only one of two states, namely completely open or completely closed. The control system can be designed to keep the at least one digitally switchable second valve closed in the event of a malfunction of the second functional unit in order to build up a hydraulic pressure exclusively at the front wheel brakes. The first valve assembly can comprise precisely one first valve (e.g. the valve capable of analog adjustment or digitally switchable valve). In addition or as an alternative, the second valve assembly can comprise precisely one second valve (e.g. the valve capable of analog adjustment or digitally switchable valve). The first valve can be a 2/2-way valve. The second valve can be a 2/2-way valve.

Each third valve assembly of the brake system in accordance with the third aspect can be controllable in order to carry out at least one of the following steps: (1) reducing a wheel brake pressure via an opened first valve of the third valve assembly, said valve being provided between the wheel brake and a hydraulic fluid reservoir, in order to discharge hydraulic fluid from the wheel brake into the hydraulic fluid reservoir; (2) trapping a wheel brake pressure with the third valve assembly closed; and (3) building up or increasing a wheel brake pressure via an opened second valve of the third valve assembly, said valve being provided between the second, electric hydraulic pressure generator and the wheel brake, and generating a hydraulic pressure by means of the second, electric hydraulic pressure generator.

A fourth aspect relates to a method for operating a hydraulic motor vehicle brake system having front wheel brakes and rear wheel brakes, wherein the brake system comprises a first functional unit having at least one first hydraulic pressure generator, which is designed to build up a respective hydraulic pressure at the front wheel brakes and the rear wheel brakes, and a first valve assembly, which is arranged between the first hydraulic pressure generator and the front wheel brakes, and a second valve assembly, which is arranged between the first hydraulic pressure generator and the rear wheel brakes. The brake system furthermore comprises a second functional unit having at least one second, electric hydraulic pressure generator, which is controllable in order to build up a respective hydraulic pressure at the front wheel brakes and the rear wheel brakes, and a third valve assembly for each wheel brake, which can be controlled for wheel brake pressure control operations at the corresponding wheel brake. In the event of a malfunction of the second functional unit, the method comprises the steps of generating a hydraulic pressure by means of the first hydraulic pressure generator and controlling at least one of the first valve assembly and the second valve assembly in such a way that a lower hydraulic pressure is established at the rear wheel brakes than at the front wheel brakes.

In general terms, the method in accordance with the fourth aspect can comprise one or more further steps, as described above and below. The method in accordance with the fourth aspect can be carried out by one of the brake systems in accordance with the third aspect and can comprise the further steps described in this context.

Also specified is a computer program product comprising program code means for carrying out a method in accordance with the second aspect or in accordance with the fourth aspect when the computer program product is executed on a processor. A motor vehicle control unit or control unit system, wherein the control unit or control unit system has at least one processor and at least one memory, in which the computer program product is stored is furthermore specified.

BRIEF DESCRIPTION OF THE DRAWINGS

Further aspects, details and advantages of the present disclosure will become apparent from the following description of illustrative embodiments with reference to the figures, of which.

DETAILED DESCRIPTION

Figure 1:
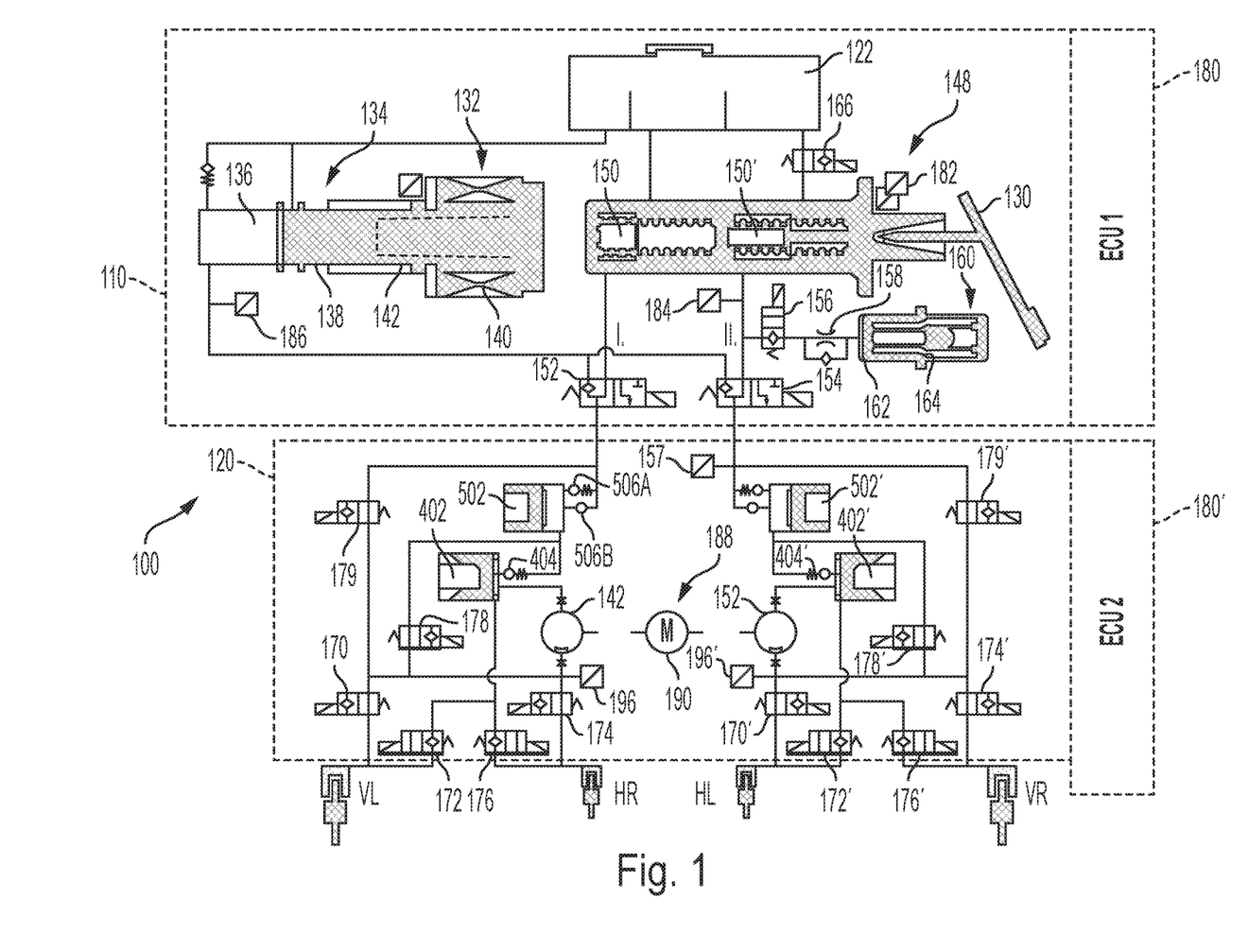
FIG. 1 shows a first illustrative embodiment of a hydraulic motor vehicle brake system.

FIG. 1 shows the hydraulic circuit diagram of a first illustrative embodiment of a hydraulic motor vehicle brake system 100 based on the BBW principle. The brake system 100 is designed to be suitable also for an autonomous or partially autonomous driving mode.

As shown in FIG. 1, the brake system 100 comprises a first functional unit 110, which provides an electrically controllable braking function at four wheel brakes VL, VR, HL, HR, and a second functional unit 120, which implements an electrically controllable braking function at the four wheel brakes VL, VR, HL, HR in a redundant way. The functional units 110, 120 are each designed to carry out wheel brake pressure control decoupled from a driver braking demand at one or more of the wheel brakes VL, VR, HL, HR. In this arrangement, the first functional unit 110 can carry out all or a subset of the wheel brake pressure control functions of the second functional unit 120 in a redundant way. The subset can consist of wheel slip control to prevent locking up of a wheel. The two functional units 110, 120 can be accommodated as separate modules in separate housing blocks. Depending on requirements, the first functional unit 110 can thus either be installed alone or in combination with the second functional unit 120.

The first functional unit 110 operates by means of a hydraulic fluid, which is stored partially in an unpressurized reservoir 122. For autonomous or partially autonomous brake pressure generation or brake pressure generation demanded by the driver at a brake pedal 130 in the BBW mode, the first functional unit 110 has a first, electric hydraulic pressure generator 132. In the illustrative embodiment, this hydraulic pressure generator 132 comprises a cylinder-piston assembly 134 based on the plunger principle with a cylinder chamber 136 and a piston 138 movable therein. The piston 138 of the hydraulic pressure generator 132 is driven by an electric motor 140 via a transmission 142. In the illustrative embodiment, the transmission 142 is designed to convert a rotary motion of the electric motor 140 into a translational motion of the piston 138.

The cylinder chamber 136 can be coupled both to the reservoir 122 and to two brake circuits I. and II., wherein each brake circuit I. and II., in turn, supplies two wheel brakes VL, HR and VR, HL, respectively, in accordance with a "diagonal split". Some other allocation of the four wheel brakes VL, VR, HL, HR to the two brake circuits I. and II. is also possible (e.g. a black and white split, in which the front wheel brakes are assigned the first brake circuit I. and the rear wheel brakes are assigned the second brake circuit II.).

To generate brake pressure in the PT mode, the first functional unit 110 has, as a second hydraulic pressure generator, a master cylinder 148, which can be actuated by the driver by means of the pedal 130. The master cylinder 148, in turn, comprises two chambers 150, 150', wherein the first chamber 150 is coupled to the first brake circuit I. and the second chamber 150' is coupled to the second brake circuit II. It should be noted that, in some implementations, especially for fully autonomous driving, the master cylinder 148 can be dispensed with.

By means of the master cylinder 148 illustrated in FIG. 1, the two brake circuits I. and II. can be supplied with pressurized hydraulic fluid (in a redundant way with respect to the electric hydraulic pressure generator 132). For this purpose, two 3/2-way valves 152, 154, which are actuable by electromagnets and occupy the normal positions illustrated in FIG. 1 in the unactuated, i.e. electrically unactivated, state, are provided. In these normal positions, the valves 152, 154 couple the master cylinder 148 fluidically to the wheel brakes VL, VR, HL, HR. It is thus still possible for a hydraulic pressure to be built up at the wheel brakes VL, VR, HL, HR by the driver by means of the brake pedal 130 acting on the master cylinder 148, even in the event of failure of the power supply (and an associated failure of the electric hydraulic pressure generator 132) (PT mode).

In the BBW mode, in contrast, the valves 152, 154 are switched in such a way that the master cylinder 148 is decoupled fluidically from the two brake circuits I. and II., while the electric hydraulic pressure generator 132 is coupled to the brake circuits I. and II. When the master cylinder 148 is decoupled from the brake circuits I. and II., the hydraulic fluid displaced from the master cylinder 148 when the brake pedal 130 is actuated is thus not delivered into the brake circuits I, and II, but is delivered into a simulator device 160 via a 2/2-way valve 156, actuable by an electromagnet, and a restrictor device 158. In its electrically unactivated normal position, in the PT mode, the valve 156 occupies the position illustrated in FIG. 1, in which the master cylinder 148 is decoupled from the simulator device 160 to enable hydraulic fluid to be delivered into the brake circuits I. and II.

The simulator device 160 is provided for the purpose of imparting the accustomed pedal feedback behavior to the driver when the master cylinder 148 is decoupled from the brake circuits I. and II. In order to be able to take up hydraulic fluid from the master cylinder 148, the simulator device 160 comprises a cylinder 162, in which a piston 164 can be displaced counter to a spring force.

A further 2/2-way valve 166, actuable by an electromagnet, between the master cylinder 148 and the reservoir 122 allows hydraulic fluid to pass out of the reservoir 122 into the master cylinder 148 in its electrically unactivated normal position in accordance with FIG. 1 in the PT mode. In its electrically activated position, in contrast, the valve 166 decouples the master cylinder 148 from the reservoir 122. In other illustrative embodiments, the functional decoupling of the brake pedal 130 and the wheel brakes VL, VR, HL, HR can also be achieved by arranging ahead of the master cylinder 148 a cylinder on which the brake pedal 130 can act. In the BBW mode, this cylinder is coupled to the simulator device 160 via the valve 156 and the restrictor device 158 and, in the PT mode, it is coupled to the master cylinder 148. A control unit 180 (also referred to as an electronic control unit, ECU) provided for controlling the valves 152, 154, 156, 166 and the hydraulic pressure generator 132 is illustrated schematically in FIG. 1. The control unit 180 is part of the first functional unit 110.

As illustrated in FIG. 1, the second functional unit 120 is arranged in the fluid path between the first functional unit 110 and the wheel brakes VL, VR, HL, HR. When fully functional and/or in the PT mode, the second functional unit 120 occupies a through flow position. This means that hydraulic fluid emerging from the first functional unit 110 can reach the wheel brakes VL, VR, HL, HR unhindered. The wheel brakes VL, VR, HL, HR are not part of the second functional unit 120 but form a separate third functional unit.

As shown in FIG. 1, the second functional unit 120 comprises an electric hydraulic pressure generator 188. In the illustrative embodiment, the hydraulic pressure generator 188 comprises an electric motor 190 and, for each brake circuit I. and II., a pump 192, 192', respectively, embodied as a gear or radial-piston pump, for example. In the illustrative embodiment, each pump 192, 192' blocks flow counter to its delivery direction, as illustrated by means of the (optional) check valves at the respective outlet and inlet of the pumps 192, 192'. The pumps 192, 192' are each configured to draw in hydraulic fluid from two hydraulic fluid reservoirs 402, 502 and 402', 502', respectively, of the second functional unit 120, said reservoirs being connected in series. Since the speed of the electric motor 192 is adjustable, the delivery rate of the pumps 192, 192' can also be adjusted by means of corresponding control of the electric motor 190. In another embodiment, the two pumps 192, 192' could be replaced by a single pump operating according to the plunger principle (e.g. with a single- or double-acting cylinder-piston assembly).

The second functional unit 120 too is of symmetrical design in relation to the brake circuits I. and II. For this reason, only the components of the second functional unit 120 which are assigned to the first brake circuit I. (here: wheel brake VL and HR) are explained in greater detail below. These components comprise a pressure sensor 196, which allows control of the pressure generator 188 (and hence of the pump 192) toward a target pressure value. Pressure evaluation and control of the pressure generator 188 are performed by a control unit 180' (also referred to as ECU) of the second functional unit 120.

Of course, it is also possible, instead of a single control unit 180', for a plurality of such control units to be provided, these being responsible for different wheel brake pressure control functions (optionally in a complementary or redundant way). In addition or as an alternative to the provision of separate control units 180, 180', it would also be possible to provide redundant electric power supplies and/or separate electric power supplies for the two functional units 110, 120.

An optional pressure sensor 197 provided on the input side of the second functional unit 120 in the region of the brake circuit II. can be provided for detection of braking input by the driver (via the master cylinder 148) into the active second functional unit 120. In this way, it would be possible, for example, to abort a brake pressure control operation currently being performed by the second functional unit 120 in favor of emergency braking of the vehicle to a standstill.

The hydraulic coupling of the wheel brakes VL, VR, HL, HR to the second functional unit 120 is determined by 2/2-way valves 170, 172, 174, 176, 178, 179 and 170', 172', 174', 176', 178', 179' of the second functional unit 120, which are actuable by electromagnets. These occupy their normal positions illustrated in FIG. 1 in the unactuated, i.e. electrically unactivated state. This means that the valves 170, 174, 178, 179 and 170', 174', 178', 179' each occupy their through flow position and the valves 172, 176 and 172', 176' each occupy their shutoff position. Since the two brake circuits I. and II. are of symmetrical design, no description is given here and below of the components assigned to the second brake circuit II, or wheel brakes HL and VR.

To carry out normal braking operations, there is a direct hydraulic connection between the electric hydraulic pressure generator 132 (or the master cylinder 148, depending on the position of the valves 152, 154), on the one hand, and the wheel brakes HR and VL of the first brake circuit I., on the other, (a corresponding situation applying to the wheel brakes HL and VR of the second brake circuit II.) in the normal position of the valves 170, 172, 174, 176, 178, 179 which is illustrated in FIG. 1.

The two valves 170 and 172 form a valve assembly assigned to wheel brake VL, while the two valves 174 and 176 form a valve assembly assigned to wheel brake HR. As will be explained below, the two valve assemblies 170, 172 and 174, 176, which are assigned to the wheel brakes VL and HR, respectively, and the hydraulic pressure generator 188 are each designed to be controlled for wheel brake pressure control operations at the respective wheel brakes VL and HR. The control unit 180' is provided for control of the valve assemblies 170, 172 and 174, 176 and of the hydraulic pressure generator 188 in the context of the wheel brake pressure control operations. The control unit 180' implements the vehicle-stabilizing wheel brake pressure control functions of an antilock system (ABS), an electronic stability control system (ESC), a traction control system (ASR) or an adaptive cruise control system (ACC), for example.

In the case of an antilock control system (ABS) the aim is to prevent locking up of the wheels during a braking operation. For this purpose it is necessary to modulate the brake pressure in the wheel brakes VL, VR, HL, HR individually. This is accomplished by setting alternately timed pressure generating, pressure holding and pressure reduction phases, which are obtained by suitable control of the valve assemblies 170, 172 and 174, 176 assigned to the wheel brakes VL and HR, respectively, and optionally of the hydraulic pressure generator 188.

During a pressure generating phase, the valves 170, 172 and 174, 176 each occupy their normal position, allowing a buildup or increase of the brake pressure in the wheel brakes VL and HR to be performed by means of the hydraulic pressure generator 188 (as in the case of a BBW braking process). For a pressure holding phase, only valve 170 or 174 is activated, i.e. transferred to its shutoff position. Since valve 172 or 176 is not activated during this process, it remains in its shutoff position. As a result, the wheel brake VL or HR is hydraulically decoupled, with the result that a brake pressure present in the wheel brake VL or HR is held constant ("trapped"). In the case of a pressure reduction phase, both valve 170 or 174 and valve 172 or 176 are activated, i.e. valve 170 or 174 is transferred to its shutoff position, and valve 172 or 176 is transferred to its through flow position. Thus, hydraulic fluid can flow out of the wheel brake VL or HR into the hydraulic fluid reservoir 402 in order to lower a brake pressure present in the wheel brake VL or HR.

Other brake pressure control operations in the normal braking mode are performed in an automated way and typically independently of actuation of the brake pedal 130 by the driver. Such automated control operations on the wheel brake pressure are performed, for example, in the context of a traction control system (ASR), which prevents spinning of individual wheels during a starting process by selective braking, an electronic stability control system (ESC), which adapts the vehicle behavior in the limit range to driver demand and to roadway conditions by selectively braking individual wheels, or an adaptive cruise control system (ACC), which maintains a distance between the host vehicle and a vehicle in front by, inter glia, automatic braking.

During the execution of an automatic wheel brake pressure control operation, a brake pressure can be built up at at least one of the wheel brakes VL and HR by control of the hydraulic pressure generator 188 by the control unit 180'. In this process, the valves 170, 172 and 174, 176 assigned to the wheel brakes VL and HR, respectively, initially occupy their normal positions illustrated in FIG. 1. Fine adjustment or modulation of the brake pressure can be performed by corresponding control of the hydraulic pressure generator 188 and of the valves 170, 172 and 174, 176 assigned to the wheel brakes VL and HR, respectively, as explained by way of example above in the context of ABS control.

Wheel brake pressure control by means of the control unit 180' is generally performed in a manner dependent on one or more measured variables describing vehicle behavior (e.g. wheel speed, yaw velocity, transverse acceleration, etc.) and/or one or more measured variables describing driver demand (e.g. actuation of the pedal 130, steering wheel angle etc.). A deceleration demand by the driver can be ascertained, for example, by means of a displacement sensor 182 (provided in redundant fashion in the illustrative embodiment), which is coupled to the brake pedal 130 or to an input member of the master cylinder 148. As an alternative or in addition, the brake pressure generated in the master cylinder 148 by the driver can be used as the measured variable describing the driver demand, this then being detected by means of at least one sensor. In FIG. 1, brake circuit I. is assigned a dedicated pressure sensor 184 for this purpose. Brake circuit II. could also be assigned a dedicated pressure sensor on the output side of the master cylinder 148 (not illustrated). A further pressure sensor 186 is provided on the output side of the hydraulic pressure generator 132.

If a malfunction of the first functional unit 110 is detected (e.g. owing to failure of the pressure generator 132 or a leak in the region of the first functional unit 110), the second functional unit 120 can take over brake pressure generation in a redundant way with respect to the first functional unit 110 in the case of a service braking operation, demanded at the brake pedal 130, at the wheel brakes VL, VR, HL and HR. During this process, the hydraulic pressure is built up by the hydraulic pressure generator 188.

On the other hand, if a malfunction of the second functional unit 120 is detected (e.g. owing to failure of the pressure generator 188 or a leak in the region of one of the hydraulic fluid reservoirs 402, 502), the first functional unit 110 can take over brake pressure control operations in a redundant way with respect to the second functional unit 120. These brake pressure control operations can relate especially (and possibly be restricted) to preventing the locking up of a wheel in accordance with a slip control strategy. Any pressure buildup which may be required in this context is then accomplished by means of the hydraulic pressure generator 132 or the master cylinder 148.

The redundancy thus created allows the use of the motor vehicle brake system 100 illustrated in FIG. 1 also for applications in partially autonomous or autonomous driving. Particularly in the latter application, the master cylinder 148 and the components associated therewith (such as the brake pedal 130 and the simulator 160) could also be omitted entirely.

In the regular operating state of the brake system 100, the hydraulic fluid reservoir 402 is not completely filled (e.g. substantially empty) in order, in the case of a wheel brake pressure reduction at one of the wheel brakes VL and HR during a brake pressure control operation, to be able to take up hydraulic fluid from one of said wheel brakes VL and VR (or from both). In the regular operating state of the brake system, the other hydraulic fluid reservoir 502 is not completely emptied (e.g. substantially full) in order, in the case of wheel brake pressure generation or increase during a brake pressure control operation, to be able to make available hydraulic fluid to the hydraulic pressure generator 188. There is therefore no need for fluid intake from the hydraulic reservoir 122 of the first functional unit 110. The background situation to the storage of hydraulic fluid in the hydraulic fluid reservoir 502 is the fact that an intake path of the pump 192 through the first functional unit 110 would not be able to make available hydraulic fluid volume with sufficient rapidity, especially at low temperatures.

Thus, the second functional unit 120 is designed essentially as a closed system, as regards the hydraulic fluid circuit there. It is only for replenishment that it may be necessary, by way of exception, to transfer hydraulic fluid from the hydraulic fluid reservoir 122 of the first functional unit 110 into the hydraulic fluid reservoir 502.

As already explained, the two hydraulic fluid reservoirs 402 and 502 are arranged in series. This means that the hydraulic pressure generator 188 can draw in fluid from hydraulic fluid reservoir 502 through hydraulic fluid reservoir 402. Here, the hydraulic layout is used to ensure that hydraulic fluid reservoir 402 has been substantially emptied by the hydraulic pressure generator 188 before said generator can deliver hydraulic fluid from hydraulic fluid reservoir 502.

More specifically, for this purpose a check valve 404 subject to a spring force is arranged upstream of an inlet of hydraulic fluid reservoir 402 in such a way that it has a blocking effect with respect to a flow direction toward the inlet. A device for opening the check valve 404 is furthermore provided. Opening occurs if hydraulic fluid reservoir 402 reaches a minimum filling level during an intake process of the hydraulic pressure generator 188, or the hydraulic pressure generator 188 begins an intake process at a minimum filling level. The minimum filling level can be equal to zero or, by virtue of the design, can have a low value greater than zero (e.g. less than 5% of the maximum holding capacity of hydraulic fluid reservoir 402). When the check valve 404 is open, the hydraulic pressure generator 188 can then draw in hydraulic fluid from the usually filled hydraulic fluid reservoir 502 through hydraulic fluid reservoir 402 and via the opened check valve 404, while emptying of hydraulic fluid reservoir 402 is ensured at the same time.

The bypass valve 178, which is designed as a 2/2-way valve actuable by an electromagnet in the illustrative embodiment, is connected in parallel with hydraulic fluid reservoir 402 and in parallel with the pump 192. This valve 178 occupies the normal position illustrated in FIG. 1 in the unactuated, i.e. electrically unactivated state. Here, the normal position means that the valve 178 occupies its through flow position. In this way, hydraulic fluid can be delivered from hydraulic fluid reservoir 502 (and, if required, from the first functional unit 110) to wheel brake VL and/or to wheel brake HR and can return to hydraulic fluid reservoir 502 (and, if required, to the first functional unit 110).

The valve 178 is controlled by the control unit 180'. In the electrically activated state, the valve 178 occupies a shutoff position, with the result that hydraulic fluid delivered by the pump 192 reaches wheel brake VL and therefore cannot escape toward hydraulic fluid reservoir 502 (and, if required, to the first functional unit 110). However, such an escape in the through flow position of the valve 178 may be desired in the context of a wheel brake pressure control operation on the part of the second functional unit 120 if brake pressure has to be reduced quickly at wheel brake VL (e.g. in the course of an ABS control operation). Since the valve 178 blocks only on one side in its shutoff position in the illustrative embodiment, the brake pressure can continue to be increased at wheel brake VL by means of the first functional unit 110 (e.g. when the master cylinder of 148 is actuated in the PT mode).

The second functional unit 120 furthermore comprises the further bypass valve 179, which is arranged in parallel with the hydraulic fluid reservoir 502 and in parallel with the bypass valve 178. The valve 179 can be controlled by the control unit 180'. The two valves 178 and 179 are switched jointly in accordance with a switching strategy given by way of example.

Valve 179, which is designed as an electromagnetically actuable 2/2-way valve in the illustrative embodiment, occupies the normal position illustrated in FIG. 1 in the unactuated, i.e. electrically unactivated, state. As in the case of valve 178, the normal position means that the valve 179 occupies its through flow position. Via the opened valve 179, it is still possible to reduce hydraulic pressure at wheel brake VL, even in the case of an incorrectly closed bypass valve 178 or a fault entailing blockage of the pressure accumulator 402 through which flow takes place. Moreover, the connection of valves 178 and 179 in parallel means that the flow resistance from the first functional unit 110 to wheel brake VL is reduced in the respectively open position of said valves, thus reducing the "time to lock" of wheel brake VL in the event of a required rapid pressure buildup at this wheel brake VL. It is self-evident that this is the case in the same way with wheel brake VR. In general terms, all the statements made in connection with the illustrative embodiments in respect of wheel brake VL apply also to wheel brakes VR, HL and HR by virtue of the symmetrical design of the brake system 100.

In the present illustrative embodiment, the hydraulic fluid reservoir 502 is designed as a pressure accumulator, more specifically as a spring-loaded piston-type accumulator. The hydraulic fluid reservoir 502 could also be a diaphragm-type accumulator or a piston sealed by means of a rolling bellows. On the outlet side, the hydraulic fluid reservoir 502 is coupled to the inlet of the hydraulic fluid reservoir 402 and, on the inlet side, is coupled to a hydraulic interface with the first functional unit 110. A check valve assembly is provided at the inlet of the hydraulic fluid reservoir 502, said assembly comprising a check valve 506A subject to a spring force and having a flow direction toward the first functional unit 110, and a check valve 506B connected in parallel therewith but without spring force loading and with a flow direction toward the hydraulic fluid reservoir 502. The hydraulic fluid reservoir 502 is provided in a form which allows through flow. The ability for through flow allows simple venting and simple changing of the hydraulic fluid in the context of a regular service.

Figure 2A:
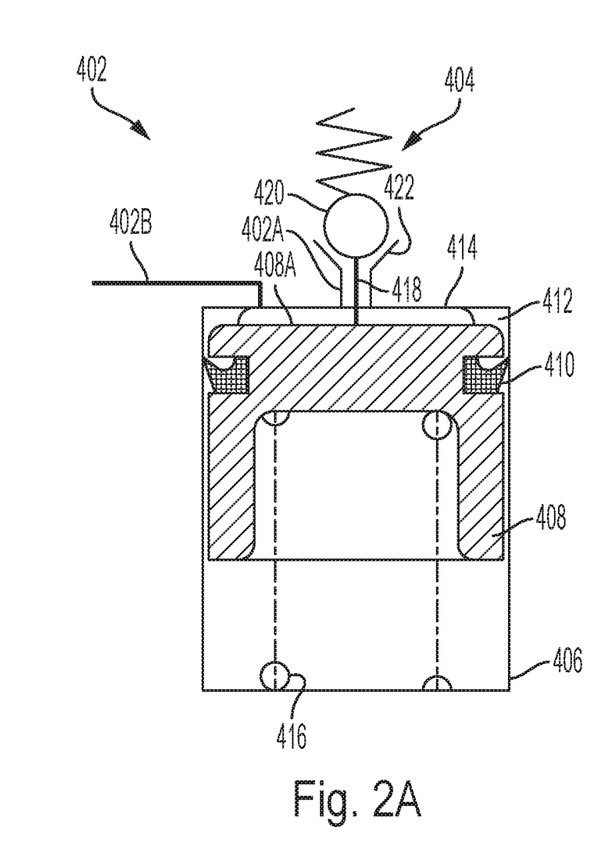
FIGS. 2A & 2B show illustrative embodiments of a hydraulic fluid reservoir of the brake system shown in FIG. 1.
Figure 2B:
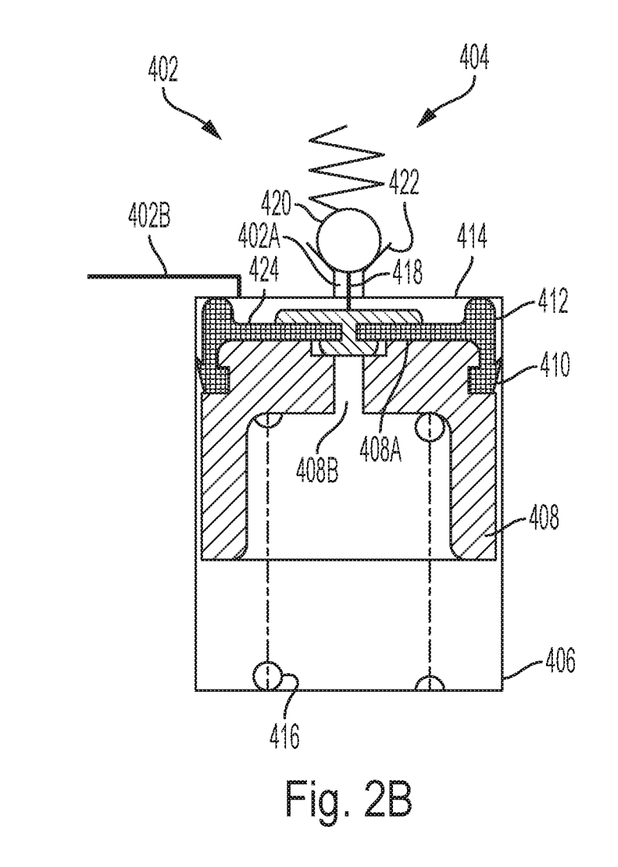

Illustrative embodiments of the hydraulic fluid reservoir 402 are illustrated in FIGS. 2A and 2B. As shown there, the hydraulic fluid reservoir 402 in each case comprises an inlet 402A, an outlet 402B, a cylinder 406 for receiving hydraulic fluid, and a piston 408 accommodated movably in the cylinder 406. The piston 408 is sealed with respect to the cylinder 406 by means of a seal 410. A minimum filling level of the hydraulic fluid reservoir 402 is defined by an optional stop 412 for the piston 408. The stop 412 can be provided on a bottom 414 of the cylinder 406, e.g. as an encircling ring (cf. FIG. 2A), as a projection on the seal 410 or on the piston 408 in the direction of the bottom 414 of the cylinder 406 (cf, FIG. 2B) or in some other way. When the piston 408 is resting on the stop 412, or the stop 412 is resting on the cylinder bottom 414, the hydraulic fluid reservoir 402 is free from residual pressure, even though the piston 408 is subject to a spring force through the provision of a helical spring

416. The spring force selected can be very low. The spring force can lead to a hydraulic pressure of less than 1 bar. In another variant, the helical spring 416 can be omitted, and the piston 418 is subject exclusively to atmospheric pressure.

As already explained above, a device is provided which opens and keeps open the check valve 404 when the hydraulic fluid reservoir 404 has reached the minimum filling level predetermined by the stop 412 during an intake process of the hydraulic pressure generator 188 (FIG. 2A) or when the hydraulic pressure generator 188 is beginning an intake process at a minimum filling level (FIG. 2B). In this way, the hydraulic pressure generator 188 can draw in hydraulic fluid through the hydraulic fluid reservoir 402 and via the opened check valve 404 (cf. FIG. 1).

Referring to FIGS. 2A and 2B, the opening device comprises the piston 408 and an actuating element 418 that can be moved together with the piston 408. In the illustrative embodiments, the actuating element 418 comprises a tappet, which can extend through the inlet 402A of the hydraulic fluid reservoir 402 and interact with a spherical valve member 420 of the check valve 404. More specifically, the actuating element 418 is designed to raise the valve member 420 from a funnel-shaped valve seat 422 of the check valve 404 counter to a spring force.

According to the variant shown in FIG. 2A, the tappet of the actuating element 418 is firmly coupled to the piston 408. More specifically, the tappet of the actuating element 418 is secured rigidly on an end face 408A of the piston 408. The length of the tappet of the actuating element 418 is chosen in such a way that the valve member 420 is raised from its valve seat 422 when the end face 408A of the piston 408 comes into contact with the stop 412. The check valve 404 is then open.

According to the variant shown in FIG. 2B, the tappet of the actuating element 418 is movably coupled to the piston 408 so that it rises from the piston 408 during an intake process. More specifically, the tappet of the actuating element 418 is arranged on a diaphragm 424, which extends across the end face 408A of the piston 408 and can be raised from this end face 408A. In order to allow such a raising movement, the diaphragm 424 can communicate with atmospheric pressure on its side facing away from the tappet of the actuating element 418. For this purpose, the piston 408 comprises a passage 408B, which opens at one end into the piston end face 408A and at another end communicates with atmospheric pressure.

In the illustrative embodiment shown in FIG. 2B, the diaphragm 424 is part of the seal 410, just like the stop 412. It is self-evident that the diaphragm 424 could also be a component separate from the seal 422 and/or from the stop 412. As mentioned above, the check valve 404 in the variant shown in FIG. 2A is opened as soon as the hydraulic fluid reservoir 402 reaches the minimum filling level predetermined by the stop 412 during an intake process of the hydraulic pressure generator 188. In the variant shown in FIG. 2B, in contrast, the check valve 404 is opened only when the hydraulic pressure generator 188 starts an intake process once the piston 408 has come into contact with the stop 412. It is namely only then that the diaphragm 424 is raised from the end face 408A of the piston 408 owing to the further reduction which then occurs in the hydraulic fluid volume in the hydraulic fluid reservoir 402 and that it can interact with the valve member 420 to open the check valve 404. However, until there is an intake process, the piston 408 rests with its stop 412 against the piston bottom 414, wherein the length of the tappet of the actuating element 418 is chosen so that it cannot yet interact with the valve member 420 (as shown in FIG. 2B). As soon as there is no longer any intake occurring, the check valve 404 is likewise closed again.

In comparison with the variant of the hydraulic pressure reservoir 402 in FIG. 2A, the variant of the hydraulic fluid reservoir 402 which is shown in FIG. 2B has the advantage that, in the PT mode, the piston 408 does not have to be displaced by the closing travel of the check valve 404 (with hydraulic fluid being taken up in the cylinder 406) before hydraulic pressure can be built up at the wheel brakes VL, HR. Thus, the hydraulic pressure buildup at the wheel brakes VL, HR can take place more quickly.

As already explained, the first functional unit 110 can perform brake pressure control operations in a redundant way with respect to the second functional unit 120 if a malfunction of the second functional unit 120 (e.g. of its power supply or of the control unit 180') is detected. These brake pressure control operations can relate, in particular, to preventing the locking up of a wheel.

Owing to the dynamic axle load distribution in the context of a braking operation, a much higher brake pressure may be built up at the wheel brakes VL, VR of the front axle than at the wheel brakes HL, HR of the rear axle, until the respective wheels lock up. However, since the hydraulic pressure accumulator 132 can build up only a central hydraulic pressure for all the wheel brakes VL, VR, HL, HR in common if there is a lack of control over the shutoff valves 170, 174, 170', 174', the front wheels would not be braked in an optimum way if brake pressure control were concentrated only on the rear wheels (e.g. through appropriate control of the hydraulic pressure generator 132). Although this solution prevents locking up of the rear wheels, it lengthens the braking distance.

Figure 3:
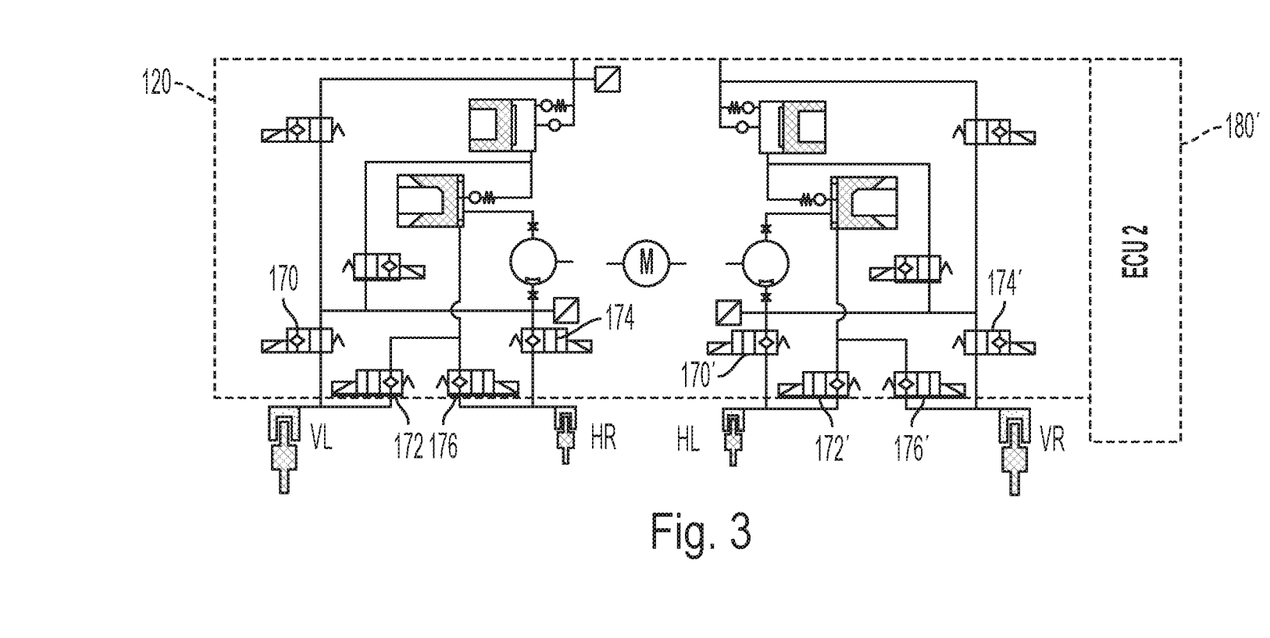
FIG. 3 shows a functional unit of a brake system in accordance with a further illustrative embodiment.

To shorten the braking distance in the event of a malfunction of the second functional unit 120, it would therefore be possible to consider designing the valves 174, 174' assigned to the rear wheels as valves which shut off flow in the normal position ("normally closed" or "NC"). This situation is illustrated in FIG. 3. More specifically, the valves 174, 174' assigned to the two rear wheel brakes HL, HR are implemented as NC valves, while the valves 176, 176' assigned to the two front wheel brakes VR, VL are still implemented as valves that are open in the normal position ("normally open" or NO). This variant allows brake pressure control by appropriate control of the hydraulic pressure generator 132, which is concentrated only on the front wheels and thus enables high braking forces to be generated. The rear wheel brakes HR, HL namely remain isolated from the hydraulic pressure buildup since the valves 174, 174' occupy their shutoff positions.

It should be noted that the implementation of the valves 174, 174" as NC valves, illustrated in FIG. 3, in a brake system 100 comprising the two functional units 110 and 120 can also be implemented independently of the specific implementation of the hydraulic fluid reservoir 402, 502. In other words, it is not necessary for this purpose that the hydraulic fluid reservoir 402 should be implemented as shown in FIGS. 2A and 2B.

In the solution shown in FIG. 3, the diagonal split of the wheel brakes VL, VR, HL, HR between the two brake circuits I., II., which is advantageous for reasons of stability, is maintained. However, it would also be possible to consider dispensing with this diagonal split and assigning the front wheel brakes VL, VR to the first brake circuit I., while the rear wheel brakes HL, HR are allocated to brake circuit II. This situation is illustrated in FIG. 4.

Figure 4:
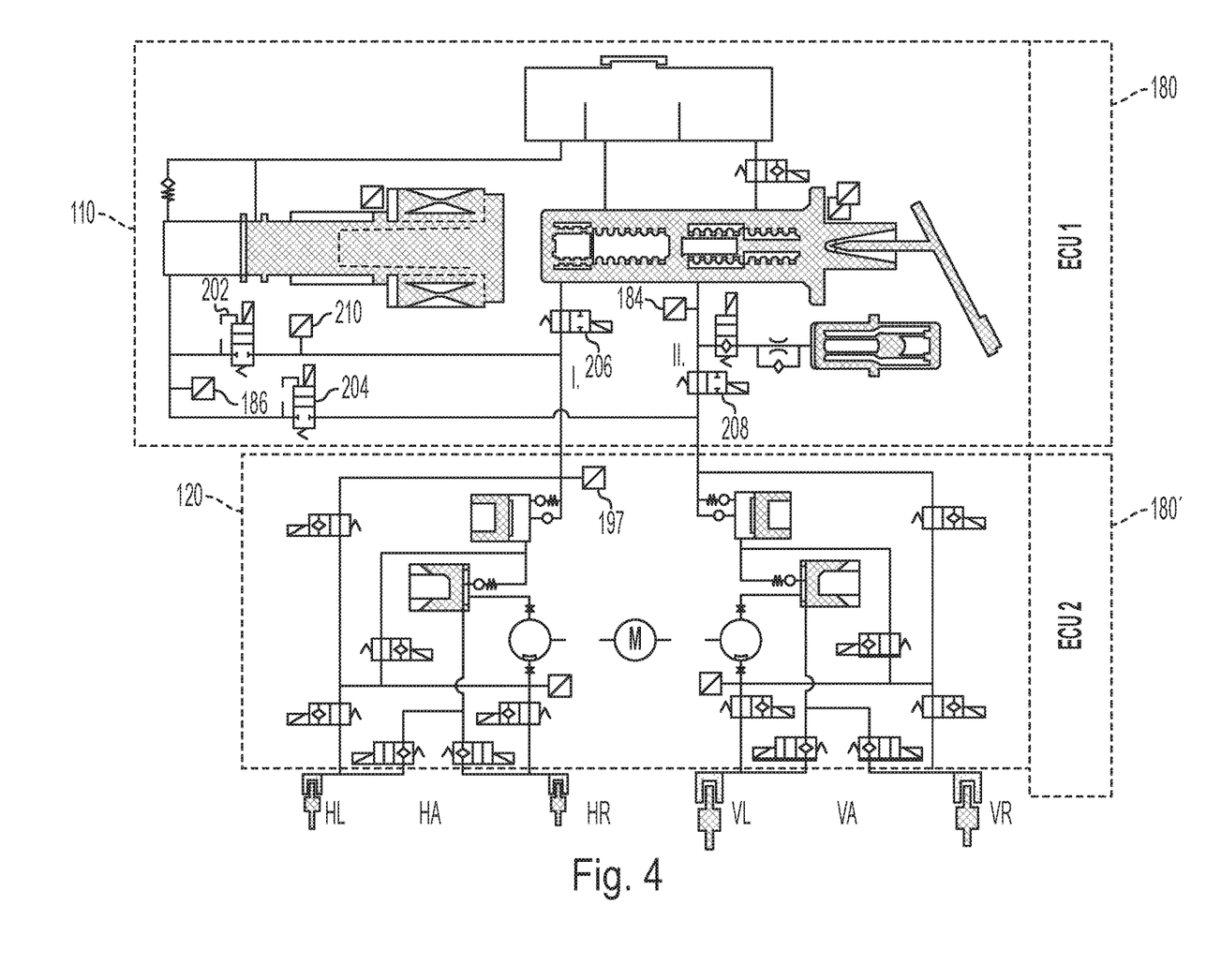
FIG. 4 shows a further illustrative embodiment of a hydraulic motor vehicle brake system.

If the modified assignment of the wheel brakes VL, VR, HL, HR to the two brake circuits I., II. is disregarded, the second functional unit 120 shown in FIG. 4 corresponds in respect of construction and functioning to the second functional unit 120 shown in FIG. 1. However, the first functional unit 110 shown in FIG. 4 has a different construction to the first functional unit 110 shown in FIG. 1. More specifically, the two 3/2-way valves 152, 154 have been replaced by four electromagnetically actuable 2/2-way valves 202, 204, 206, 208, which assume the states shown in FIG. 4 in the normal positions (i.e. without electric activation). More specifically, the two valves 202, 204 assigned to the hydraulic pressure generator 132 are shut off, while the two valves 206, 208 assigned to the master cylinder 148 are open. In this way, hydraulic fluid can be delivered to the wheel brakes VL, VR, HL, HR by means of the master cylinder 148 in the PT mode.

The two valves 202, 204 assigned to the hydraulic pressure generator 132 are valves capable of analog adjustment. Accordingly, the valves 202, 204 can be controlled to set a desired opening cross section, which can be different from "fully open" and "fully closed". In this way; the pressures in the two brake circuits I. and II. can be modulated separately from one another. The valves 202, 204 can be controllable in a passive way (e.g. by a prevailing hydraulic pressure) or in an active way (e.g. electrically).

A control system stored as a program code in the control unit 180 is designed to control at least valve 202 and/or valve 204 in such a way when hydraulic pressure is generated by means of the hydraulic pressure generator 132 in the case of a malfunction of the second functional unit 120 that a lower hydraulic pressure is established at the rear wheel brakes HR, HL, i.e. in brake circuit I., than at the front wheel brakes VR, VL, i.e. in brake circuit II. More specifically, the pressure difference is set in such a way that both locking up of the front wheels and locking up of the rear wheels, at which only a relatively low wheel brake pressure can be built up, is avoided. In this case, slip control for the two front wheels is performed jointly by means of control of valve 204 and in relation to the front wheel which will be the next to lock up. In a similar way; slip control for the two rear wheels is performed jointly by means of control of valve 202 and in relation to the rear wheel which will be the next to lock up.

In this way, control of the valves 202 and 204 in the event of a malfunction of the second functional unit 120 can take place in accordance with a control strategy which prevents locking up of the front wheels and of the rear wheels separately. Thus, the control system can be designed to limit the hydraulic pressure in the first brake circuit I. and thus at the rear wheel brakes HR, HL by means of valve 202 in such a way that the rear wheels do not lock up. Furthermore, the control system can be designed to limit the hydraulic pressure in the second brake circuit II. and thus at the front wheel brakes VR, VL by means of valve 204 in such a way that the front wheels do not lock up. At the same time; an optimum high level can be chosen for the "unlimited" pressure for the front wheels which is built up by the hydraulic pressure generator 132.

The first functional unit 110 comprises an optional pressure sensor 210 in a fluid path between valve 202 and the rear wheel brakes HR, HL. The control system stored in the control unit 180 is designed to take account of an output signal of the pressure sensor 210 in controlling the valve 202 for antilock control. As an alternative or in addition, the output signal of the pressure sensor 196 could also be used. In addition, the signal of pressure sensor 184 and/or of pressure sensor 197 could also be used by the control system to ascertain driver requirements.

Instead of the two valves 202, 204 capable of analog control, the first valve assembly 110 can also comprise digitally switchable valves. In this case, the control system can be designed to keep the digitally switchable valve for the first brake circuit I. closed in the event of a malfunction of the second functional unit 120 in order to build up a hydraulic pressure exclusively at the front wheel brakes VL, VR. Thus, locking up of the rear wheels is reliably avoided.

In this way, the valves 206, 208 assigned to the master cylinder 148 can also be controlled in order, in the PT mode to close valve 206 and keep valve 208 open during hydraulic pressure generation by means of the master cylinder 148 and in the event of a simultaneous malfunction of the second functional unit 120. Thus, in the PT mode, no hydraulic pressure is built up at the rear wheel brakes HR, HL, while the hydraulic pressure at the front wheel brakes VR, VL can be modulated by means of the master cylinder 148. If necessary, it is also possible for valve 208 to be closed temporarily for antilock control at the front wheels.

As will have emerged from the description of the illustrative embodiments, the present disclosure makes it possible to make available a brake system with high redundancy and high operational reliability. At the same time, the braking distance achieved can be short, even in the case of functional restrictions.

What is claimed is:
1. A hydraulic motor vehicle brake system, comprising:
a first functional unit having
at least one first hydraulic pressure generator, which is designed to build up a hydraulic pressure at a wheel brake; and
a first hydraulic fluid reservoir, from which the first hydraulic pressure generator can draw in hydraulic fluid; and
a second functional unit having
at least one second, electric hydraulic pressure generator, which is controllable in order to build up a hydraulic pressure at the wheel brake;
a check valve;
at least one second hydraulic fluid reservoir, having an outlet, via which the second, electric hydraulic pressure generator can draw in hydraulic fluid, and an inlet, relative to which the check valve is arranged upstream in such a way that it has a blocking effect toward the inlet in respect of a flow direction;
a device for opening the check valve when the second hydraulic fluid reservoir reaches a predetermined filling level during an intake process of the second, electric hydraulic pressure generator or the second, electric hydraulic pressure generator begins an intake process at a predetermined filling level, with the result that the second, electric hydraulic pressure generator can draw in hydraulic fluid through the second hydraulic fluid reservoir and via the opened check valve;
a third hydraulic fluid reservoir arranged in series with the second hydraulic fluid reservoir between the first functional unit and the second, hydraulic pressure generator, wherein the check valve is arranged in a hydraulic path between the inlet of the second hydraulic fluid reservoir and an outlet of the third hydraulic fluid reservoir, thus enabling the second, electric hydraulic pressure generator to draw in hydraulic fluid from the third hydraulic fluid reser- voir through the second hydraulic fluid reservoir and via the opened check valve; and a second check valve subject to a spring force at an inlet of the third hydraulic fluid reservoir.

2. The hydraulic motor vehicle brake system as defined in claim 1, wherein the device comprises a piston, which is accommodated movably in the second hydraulic fluid reservoir, and an actuating element, which is movable together with the piston and can interact with a valve member of the check valve.

3. The hydraulic motor vehicle brake system as defined in claim 2, wherein the actuating element comprises a tappet, which is coupled to the piston and can extend through the inlet in order to interact with the valve member.

4. The hydraulic motor vehicle brake system as defined in claim 3, wherein the tappet is coupled rigidly to the piston.

5. The hydraulic motor vehicle brake system as defined in claim 3, wherein the tappet is coupled movably to the piston in order to move away from the piston during the intake process.

6. The hydraulic motor vehicle brake system as defined in claim 5, wherein the tappet is arranged on a diaphragm, which extends over at least some region of a surface of the piston and can be raised from the surface.

7. The hydraulic motor vehicle brake system as defined in claim 1, wherein the second hydraulic fluid reservoir is designed as a low-pressure accumulator subject to spring force.

8. The hydraulic motor vehicle brake system as defined in claim 6, wherein a passage extends through the piston such that atmospheric pressure acts on the diaphragm for raising the diaphragm from the surface of the piston.

9. The hydraulic motor vehicle brake system as defined in claim 8, wherein the second hydraulic fluid reservoir is not completely filled in a normal operating state of the brake system in order to enable hydraulic fluid to be taken up in the case of a wheel brake pressure reduction at the wheel brake.

10. The hydraulic motor vehicle brake system as defined in claim 1, wherein the second functional unit comprises a valve, which is arranged in a fluid path which extends parallel to the second hydraulic reservoir.

11. The hydraulic motor vehicle brake system as defined in claim 1, wherein the third hydraulic fluid reservoir is substantially filled in a normal operating state of the brake system in order to be able to make available hydraulic fluid to the second, electric hydraulic pressure generator.

12. The hydraulic motor vehicle brake system as defined in claim 1, wherein a hydraulic path starting from the first functional unit opens into the inlet of the third hydraulic fluid reservoir.

13. The hydraulic motor vehicle brake system as defined in claim 1, wherein the second functional unit comprises a valve, which is arranged in a fluid path which extends parallel to the third hydraulic reservoir.

14. The hydraulic motor vehicle brake system as defined in claim 1, wherein the second functional unit is arranged in a hydraulic fluid path between the first functional unit and the wheel brake.

15. The hydraulic motor vehicle brake system as defined in claim 1, wherein the second functional unit further comprises:
- a first valve fluidly connected to the third hydraulic fluid reservoir and arranged in parallel with the second hydraulic fluid reservoir; and
- a second valve fluidly connected to the first functional unit and arranged in parallel with the serially connected second and third hydraulic fluid reservoirs.

* * * * *